United States Patent
Fang et al.

(10) Patent No.: US 12,493,356 B2
(45) Date of Patent: Dec. 9, 2025

(54) METHOD, DEVICE, AND SYSTEM OF GENERATING TRAVEL ORDER, RIDE-HAILING METHOD, AND TERMINAL DEVICE

(71) Applicant: ShangHai Qwik Smart Technology Co., Ltd., Shanghai (CN)

(72) Inventors: Jianwei Fang, Shanghai (CN); Zhenkai Ying, Shanghai (CN)

(73) Assignee: ShangHai Qwik Smart Technology Co., Ltd., Shanghai (CN)

( * ) Notice: Subject to any disclaimer, the term of this patent is extended or adjusted under 35 U.S.C. 154(b) by 194 days.

(21) Appl. No.: 18/566,215

(22) PCT Filed: Dec. 13, 2021

(86) PCT No.: PCT/CN2021/137485
§ 371 (c)(1),
(2) Date: Dec. 1, 2023

(87) PCT Pub. No.: WO2022/252556
PCT Pub. Date: Dec. 8, 2022

(65) Prior Publication Data
US 2024/0256051 A1    Aug. 1, 2024

(30) Foreign Application Priority Data
Jun. 1, 2021    (CN) .......................... 202110608348.9

(51) Int. Cl.
*G06Q 50/47*    (2024.01)
*G06F 3/01*    (2006.01)
(Continued)

(52) U.S. Cl.
CPC ............. *G06F 3/017* (2013.01); *G06Q 10/02* (2013.01); *G06Q 50/47* (2024.01); *H04W 4/026* (2013.01)

(58) Field of Classification Search
CPC .. G06Q 10/02; G06Q 30/0635; G06Q 40/125; G06Q 50/47; G06Q 50/40;
(Continued)

(56) References Cited

U.S. PATENT DOCUMENTS 10,349,223 B1 * 7/2019 Yoo .................. G06Q 50/40
2008/0307342 A1 12/2008 Furches et al.
(Continued)

FOREIGN PATENT DOCUMENTS

| CN | 104008643 A | 8/2014 |
|---|---|---|
| CN | 108038774 A | 5/2018 |

(Continued)

OTHER PUBLICATIONS

The World Intellectual Property Organization (WIPO) International Search Report for PCT/CN2021/137485 Feb. 24, 2022 5 Pages (including translation).

*Primary Examiner* — Rinna Yi
(74) *Attorney, Agent, or Firm* — ANOVA LAW GROUP, PLLC

(57) ABSTRACT

A method of generating a travel order includes: receiving a first gesture collected by a first terminal device and a location of the first terminal device; in response to a request for a travel order triggered by the first gesture, receiving a second gesture collected by the first terminal device; generating the travel order including a departure address and a destination address, wherein the destination address matches the second gesture, and the departure address is associated with the location of the first terminal device; and sending the travel order.

11 Claims, 5 Drawing Sheets

(51) Int. Cl.
*G06Q 10/02* (2012.01)
*H04W 4/02* (2018.01)

(58) Field of Classification Search
CPC . H04L 67/52; G06F 3/017; G06F 3/01; G06F 3/0488; H04W 4/026
See application file for complete search history.

(56) References Cited

U.S. PATENT DOCUMENTS

2020/0272143 A1\* 8/2020 Scott ................ B60W 10/06
2022/0005140 A1\* 1/2022 Beaurepaire ........ G06F 16/9535

FOREIGN PATENT DOCUMENTS

| | | |
|---|---|---|
| CN | 108205399 A | 6/2018 |
| CN | 110489048 A | 11/2019 |
| CN | 112612362 A | 4/2021 |

\* cited by examiner

METHOD, DEVICE, AND SYSTEM OF GENERATING TRAVEL ORDER, RIDE-HAILING METHOD, AND TERMINAL DEVICE

CROSS-REFERENCE TO RELATED APPLICATION

This application is a national stage application of International Application No. PCT/CN2021/137485, filed on Dec. 13, 2021, which claims priority to Chinese Patent Application No. 202110608348.9, filed with the China National Intellectual Property Administration (CNIPA) on Jun. 1, 2021, the entire contents of all of which are incorporated herein by reference.

TECHNICAL FIELD

The present disclosure relates to the technical field of ride-hailing technologies and, more particularly, to a method, device, and system for generating a travel order, and also to a ride-hailing method, terminal device, and a computer-readable storage medium.

BACKGROUND

With the rapid development of mobile technology and the increase of users' travel needs, ride-hailing software has been widely used by users.

In a process of actually using the ride-hailing software, a user needs to initiate a ride-hailing request to a ride-hailing platform through the ride-hailing software, and the user is also required to input a destination address, such that the ride-hailing platform can dispatch a vehicle according to the user's location and the destination address. Thus, the vehicle that receives an order can arrive at the user's location and take the user to the destination address.

Currently, a ride-hailing method often requires the user to perform an operation on the ride-hailing software. However, under the circumstances that it is inconvenient for the user to perform the operation on the ride-hailing software, or the elderly and children are not familiar with operation of the ride-hailing software, it is still inconvenient to hail a car ride, thereby degrading user's ride-hailing experience.

SUMMARY

The present disclosure solves a technical problem in the existing technology to overcome the inconvenience of manually operating on a ride-hailing software. The present disclosure provides a method, an apparatus, and a system of generating a travel order, a method of ride-hailing, a terminal device, and a computer-readable storage medium.

The present disclosure solves the above technical problem through the following technical solutions.

One aspect of the present disclosure provides a method of generating a travel order. The method includes: receiving a first gesture collected by a first terminal device and a location of the first terminal device; in response to a request for a travel order triggered by the first gesture, receiving a second gesture collected by the first terminal device; generating the travel order including a departure address and a destination address, where the destination address matches the second gesture, and the departure address is associated with the location of the first terminal device; and sending the travel order for confirmation of the travel order.

Another aspect of the present disclosure provides an apparatus of generating a travel order. The apparatus includes: a memory; a processor coupled to the memory; and a computer program stored in the memory and executable by the processor. When being executed by the processor, the computer program causes the processor to perform the disclosed method of generating a travel order.

Another aspect of the present disclosure provides a method of ride-hailing. The method includes: in response to a first gesture collected by a gesture collection device, sending the first gesture and a location of the gesture collection device; in response to a second gesture collected by the gesture collection device, sending the second gesture; and receiving a travel order including a departure address and a destination address. The departure address is associated with the location, and the destination address matches the second gesture.

Another aspect of the present disclosure provides a terminal device. The terminal device includes: a memory; a processor coupled to the memory; and a computer program stored in the memory and executable by the processor. When being executed by the processor, the computer program causes the processor to perform the disclosed method of ride-hailing.

Another aspect of the present disclosure provides a non-transitory computer-readable storage medium storing a computer program. When being executed by a processor, the computer program causes the processor to perform the disclosed method of generating a travel order or the disclosed method of ride-hailing.

Another aspect of the present disclosure provides a system of generating a travel order. The system includes: a ride-hailing platform; and a first terminal device including a gesture collection device for collecting gestures. In response to a first gesture collected by the gesture collection device, the first terminal device sends the first gesture and a location of the first terminal device to the ride-hailing platform. In response to a request for a travel order triggered by the first gesture, the ride-hailing platform receives a second gesture collected by the first terminal device, generates the travel order including a departure address and a destination address, and sends the travel order, wherein the departure address is associated with the location of the first terminal device and the destination address matches the second gesture.

The beneficial effects of the present disclosure include the following. The first gesture collected by the first terminal device triggers the request for a travel order. The departure address and destination address can be determined based on the location of the first terminal device and the second gesture collected by the first terminal device, respectively. The travel order can then be generated based on the departure address and destination address.

In the method of generating a travel order, a user holding the first terminal device makes the first gesture and the second gesture to book a car. As compared with the need for the user to manually operate a ride-hailing software, the method provides convenience for the user to book the car and improves user's ride-hailing experience.

DETAILED DESCRIPTION OF THE EMBODIMENTS

The embodiments of the present disclosure will be further described below, but the present disclosure is not limited thereto.

Embodiment One

Figure 1:
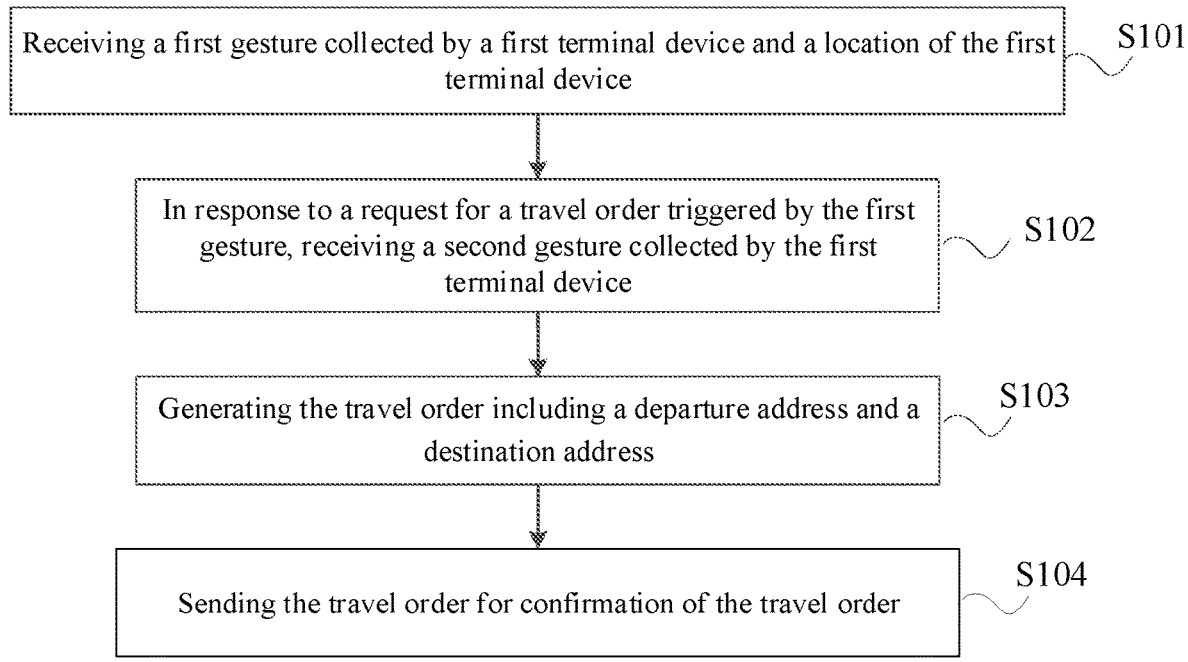
FIG. 1 is a flowchart of an exemplary method of generating a travel order according to some embodiments of the present disclosure.

FIG. 1 is a flowchart of an exemplary method of generating a travel order according to some embodiments of the present disclosure. The method may be executed by a device for generating a travel order, and the device for generating a travel order may be implemented by means of software and/or hardware. Specifically, the device for generating a travel order may be part or all of a ride-hailing platform. For illustration purpose, the method of generating a travel order will be described as being executed by the ride-hailing platform. As shown in FIG. 1, the method of generating a travel order provided by the present disclosure may include the following processes (S101 to S104).

At S101, a first gesture collected by a first terminal device and a location of the first terminal device are received.

In some embodiments, a user uses the first terminal device to book a car, and the first terminal device can directly communicate with the ride-hailing platform. Specifically, the first terminal device collects the first gesture made by the user, and sends the first gesture to the ride-hailing platform. The first gesture may be a finger gesture, a hand gesture, or an arm gesture. The ride-hailing platform receives the first gesture collected by the first terminal device. The first terminal device may be a mobile terminal such as a mobile phone, a wearable device, a notebook computer, and a tablet computer. The first terminal device may communicate with the ride-hailing platform through a wireless local area network or a cellular network.

Figure 2:
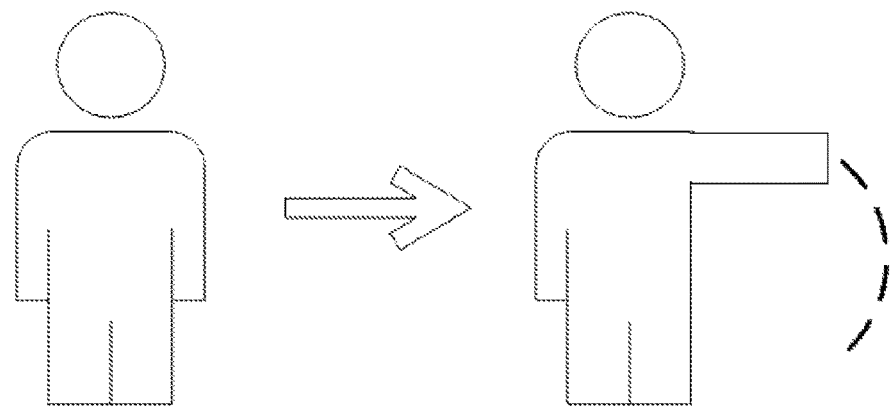
FIG. 2 is a schematic diagram of a first gesture by a user holding a first terminal device according to some embodiments of the present disclosure.
Figure 3:
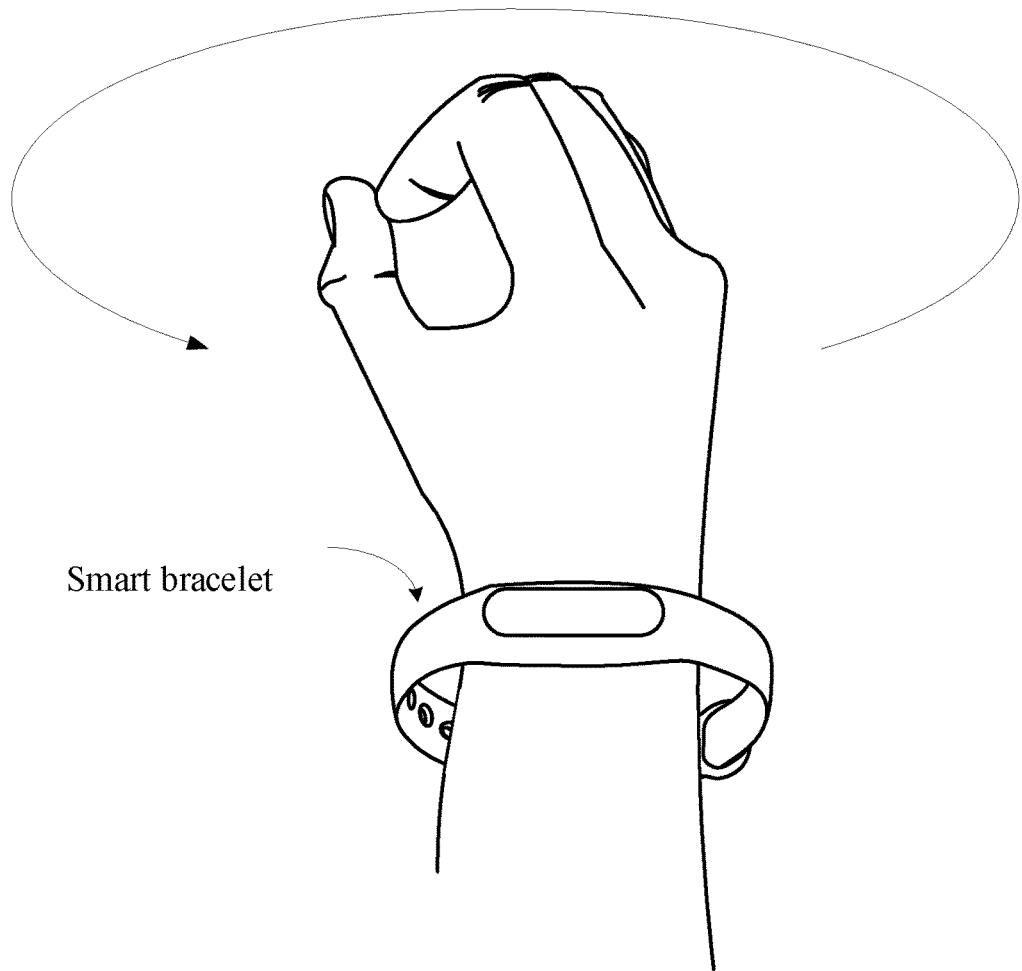
FIG. 3 is a schematic diagram of the first gesture of drawing a circle in the air by the user wearing a smart bracelet according to some embodiments of the present disclosure.

In some embodiments, the user may make the first gesture by holding the first terminal device. In the example shown in FIG. 2, the user may hold the first terminal device and make the first gesture of raising a hand. In the example shown in FIG. 3, the user may wear a smart bracelet and make the first gesture of drawing a circle in the air.

A gesture collection device in the first terminal device may be used to collect the first gesture. In some embodiments, the gesture collection device is a gyroscope, which is used to collect angular velocities of X, Y, and Z axes of the terminal device, to determine the first gesture according to the collected angular velocities.

In addition, location information sent by positioning satellites may be received by a built-in GPS module of the first terminal device, or the location information sent by base stations may be received by a built-in SIM chip of the first terminal device. Thus, a location of the first terminal device may be determined based on the location information, and the location of the first terminal device may be sent to the car-hailing platform. The ride-hailing platform receives the location of the first terminal device.

The ride-hailing platform may receive the location information from more than one device, for example, the first terminal and the second terminal. The first terminal and the second terminal may be a smartphone and a smart bracelet. In this case, the smartphone and the smart bracelet may have different positioning functions. For example, the location information of the smartphone and the smart bracelet may be obtained through GPS, Wi-Fi, Bluetooth, etc. To improve accuracy of the location information, the location information obtained by the smartphone and the smart bracelet may be fused together by a fusion algorithm, such as Kalman filter algorithm. A weighted average may be calculated based on signal strength or other factors to obtain more accurate location information.

At S102, in response to the first gesture triggering a travel order request, a second gesture collected by the first terminal device is received.

In some embodiments, whether the first gesture matches a target gesture is determined. If it is determined that the first gesture matches the target gesture, the request for a travel order is triggered. If it is determined that the first gesture does not match the target gesture, the request for a travel order is not triggered. The ride-hailing platform determines whether the first gesture collected by the first terminal device matches a pre-stored target gesture. If the ride-hailing platform determines that the first gesture collected by the first terminal device matches the pre-stored target gesture, the ride-hailing platform considers that the user has made the request for initiating a travel order, that is, a request for ride-hailing.

In some embodiments, S102 further includes the following processes (S102a~S102b).

At S102a, in response to the first gesture triggering a request for a travel order, prompt information is sent to the first terminal device to trigger the first terminal device to collect more gestures. The prompt information sent to the first terminal device is used to prompt the user holding the first terminal device to input a travel destination address by making another gesture. The prompt information may be vibration prompt information, light prompt information, sound prompt information, text prompt information, and the like.

At S102b, the second gesture collected by the first terminal device is received.

At S103, a travel order including a departure address and a destination address is generated. The destination address matches the second gesture, and the departure address is associated with the location of the first terminal device.

In some embodiments, the ride-hailing platform receives the second gesture made by the user holding the first terminal device, and searches for a destination address that matches the second gesture in pre-stored relationships between gestures and destination addresses. For example, the user wears a smart bracelet and writes numbers "1", "2" and so on in the air. In the pre-stored relationships between gestures and destination addresses, the destination address matching the gesture corresponding to a handwritten number "1" is Addr1, and the destination address matching the gesture corresponding to a handwritten number "2" is Addr2.

The pre-stored relationships between gestures and destination addresses can be set by the user holding the first terminal device, or can be set remotely by other users. For example, the user holding the first terminal device is a young person, who can set the pre-stored relationships between gestures and destination addresses by himself. In another example, the user holding the first terminal device is an elderly person, and children of the elderly person may remotely set the pre-stored relationships between gestures and destination addresses through other terminal devices.

In a specific scenario, the children of the elderly person may set a gesture (such as waving) that is convenient for the elderly person to operate through an application program, and may set the destination address as the address of the elderly person's residence or an address of a target hospital. In this way, the elderly person may generate a travel order to go home or to the hospital through simple gestures, thereby making it convenience for the elderly person to travel.

In some embodiments, different prompt information may be sent to the first terminal device according to whether the ride-hailing platform finds a destination address that matches the second gesture, to inform the user whether the destination address is sent successfully. In some embodiments, if the ride-hailing platform finds the destination address that matches the second gesture, the ride-hailing platform sends prompt information Msg1 to the first terminal device, and the first terminal device will vibrate once according to the prompt information Msg1 to inform the user that the destination address has been sent successfully. If the ride-hailing platform does not find any destination address that matches the second gesture, the ride-hailing platform sends prompt message Msg2 to the first terminal device, and the first terminal device will vibrate twice according to the prompt message Msg2 to inform the user that the destination address has failed to be sent.

In a specific scenario, to assist the elderly person, the children of the elderly person may set the same gesture to match multiple addresses frequented by the elderly person. For example, a gesture of waving corresponds to the address of the hospital and the address of the residence at the same time. The same gesture of waving matches the address of the hospital and the address of the residence at the same time. The elderly person may have a chance of further selecting the destination address through a notification message. In this way, a burden of memorizing the addresses by the elderly person is minimized, thereby making it convenient for the elderly person.

In some embodiments, after the destination address is selected, the destination address may be sent to a second terminal, or the travel order may be sent to the second terminal after the travel order is generated, such that the second terminal timely obtains an itinerary or a trip sharing link to track trip status in real-time. For example, the holder of the second terminal may be a relative of the elderly person. Through sending the destination address or the travel order to the second terminal, the relative of the elderly person may keep abreast of the destination address of the travel order or the itinerary of the elderly person.

In some embodiments, after the second terminal receive the destination address or the travel order, the second terminal may retrieve the location information of the first terminal periodically to obtain a real time travel status.

It should be noted that if the ride-hailing platform cannot find any destination address that matches the second gesture, the user holding the first terminal device may make a new gesture according to the prompt information or input the destination address in other ways. In some embodiments, an option of not matching the destination address may also be set in the second gesture, and after the second gesture is matched, the destination address may be input in other ways.

In some embodiments, other ways of inputting the destination address exclude using gestures. For example, one of the other ways of inputting the destination address may include a voice method. The user may input the destination address "No. 88 Huaihai Road" by saying "I want to go to No. 88 Huaihai Road". The other ways of inputting the destination address may include manually inputting. For example, the user may input the destination address by manually inputting "No. 88 Huaihai Road". In another example, the destination address may be determined by a driver. The driver determines the destination address through a conversation with the user. In another example, after the user gets into the car, the driver inputs the destination address.

In some embodiments, if the elderly person matches the address of the hospital and the address of the residence at the same time through the gesture of waving, a voice instruction may be sent to the elderly person for making further selections. For example, the voice instruction is "Excuse me, do you want to go to the hospital or go home?" The elderly person may set the target address as the address of the residence by saying keywords "go home". Alternatively, the elderly person may set the target address as the target hospital by saying keywords "hospital". In this way, multiple destination addresses may be matched through the same simple gesture. Thus, it is not only more convenient for the elderly person to use a ride-hailing service, but also making it more feasible for target address matching.

In addition, in some embodiments, if the ride-hailing platform cannot find any destination address that matches the second gesture, the ride-hailing platform may send the prompt information to other terminal devices associated with the first terminal device to alert users of other terminal devices to remotely input the destination address.

Figure 4:
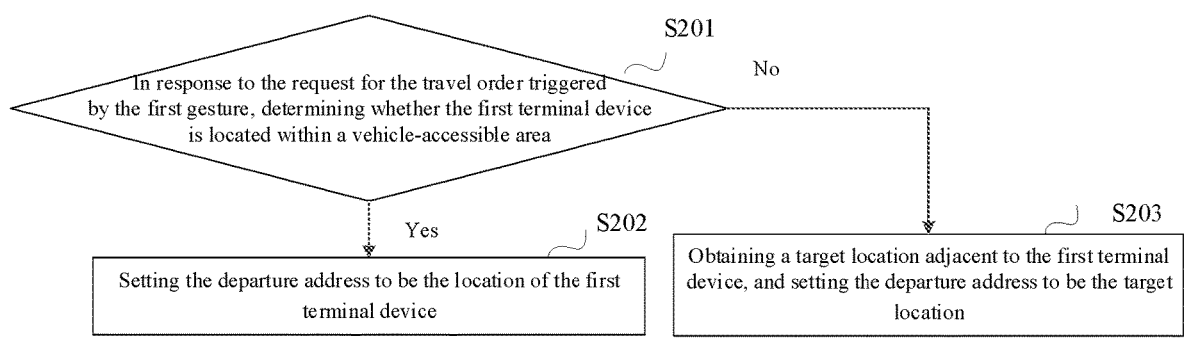
FIG. 4 is a partial flowchart of another exemplary method of generating a travel order according to some embodiments of the present disclosure.

In some embodiments, as shown in FIG. 4, the method for generating the travel order further includes the following processes.

At S201, in response to the request for a travel order triggered by the first gesture, whether the location of the first terminal device is within a vehicle-accessible area is determined. If it is determined that the location of the first terminal device is within the vehicle-accessible area, S202 is performed. Otherwise, S203 is performed.

In some embodiments, whether the location of the first terminal device is located in a vehicle-accessible area can be determined by checking whether the location of the first terminal device is within an access-restricted residential area, a scenic area, or an area where vehicles are prohibited from entering, etc. If the location of the first terminal device is not in these areas, it is determined that the location of the first terminal device is a vehicle-accessible area. If the location of the first terminal device is in these areas, it is determined that the location of the first terminal device is an area that cannot be reached by vehicles.

At S202, a departure address is set as the location of the first terminal device.

At S203, a target location near the first terminal device is obtained, and the departure address is set to be the target location. The target location needs to be a vehicle-accessible area. It should be noted that after obtaining the target location, the ride-hailing platform may send prompt information to the first terminal device for prompting the user to go to the target location. If a confirmation operation input by the user in response to the prompt information is received, that is, the user agrees to set the departure address as the target location, a travel order including the departure address and the destination address is generated.

In some embodiments, a nearest vehicle-accessible area may be searched centering on the location of the first terminal device, and used as the departure address of the travel order. It is also possible to search for a plurality of vehicle-accessible areas centering on the location of the first terminal device, and to present the plurality of vehicle-accessible areas to the user. The user selects one vehicle-accessible area from the plurality of vehicle-accessible areas as a target location, and sets the target location as the departure address of the travel order.

At S104, the travel order is sent for confirmation of the travel order.

In some embodiments, the ride-hailing platform may send the travel order to the first terminal device, such that the user holding the first terminal device can confirm whether information in the travel order is correct. If the information is confirmed to be incorrect, the travel order can be canceled in time. The information in the travel order may include not only the departure address and the destination address, but also information such as travel time and number of passengers.

Understandably, the ride-hailing platform needs to send the travel order to the target vehicle. If the target vehicle agrees to accept the travel order, it means that the user holding the first terminal device has successfully booked the car (i.e., the target vehicle). At this time, the ride-hailing platform may send vehicle information of the target vehicle accepting the travel order to the first terminal device, such that the user can take a ride according to the vehicle information. In some embodiments, the target vehicle may be all vehicles contracted with the ride-hailing platform, or idle vehicles that have not received a travel order, or vehicles of a specific model such as sport utility vehicle (SUV).

In some embodiments, the first gesture collected by the first terminal device triggers the request for a travel order, and the location of the first terminal device and the second gesture collected by the first terminal device determine the departure address and the destination address, respectively. The travel order is then generated based on the departure address and destination address. By using the method of generating a travel order provided in the present disclosure, the user holding the first terminal device can realize the car booking by making the first gesture and the second gesture. Compared with the need for the user to manually operate the car booking software, the method provides the convenience for the user to book a car, thereby improving the user's ride-hailing experience.

Figure 5:
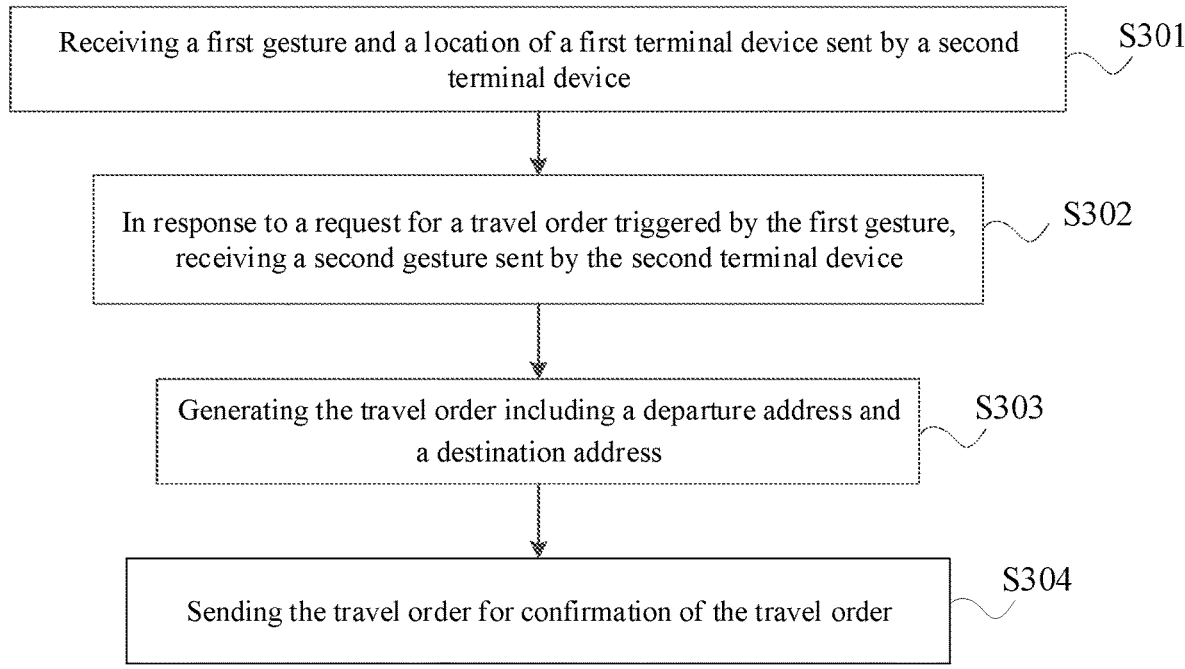
FIG. 5 is a flowchart of another exemplary method of generating a travel order according to some embodiments of the present disclosure.

FIG. 5 is a flowchart of another exemplary method of generating a travel order according to some embodiments of the present disclosure. The method may be executed by a device for generating a travel order, and the device for generating a travel order may be implemented by means of software and/or hardware. Specifically, the device for generating a travel order may be part or all of the ride-hailing platform. The method of generating a travel order will be described as being executed by the ride-hailing platform. As shown in FIG. 5, the method for generating a travel order provided by the present disclosure may include the following processes (S301~S304).

At S301, a first gesture and a location of the first terminal device sent by the second terminal device are received.

In some embodiments, the first terminal device communicates with the ride-hailing platform through the second terminal device. For example, the first terminal device collects the first gesture made by the user, and sends the first gesture and the location of the first terminal device to the second terminal device. The second terminal device sends the first gesture and the location of the first terminal device to the ride-hailing platform. The ride-hailing platform receives the first gesture and the location of the first terminal device sent by the second terminal device. The first terminal device and the second terminal device may be mobile terminals such as mobile phones, wearable devices, notebook computers, and tablet computers. The first terminal device may communicate with the second terminal device through a Bluetooth network, a wireless local area network or a cellular network. The second terminal device may communicate with the car-hailing platform through the wireless local area network or the cellular network.

In some embodiments, the first terminal device is a smart bracelet, the second terminal device is a mobile phone, and the smart bracelet and the mobile phone are connected through Bluetooth. Due to a limited memory space of the smart bracelet, it is impossible to install the ride-hailing software. It is necessary to realize the communication with the car-hailing platform through the ride-hailing software installed in the mobile phone.

At S302, a second gesture sent via the second terminal device in response to the first gesture triggering the request for a travel order is received.

In some embodiments, in response to the request for a travel order triggered by the first gesture, prompt information is sent to the first terminal device via the second terminal device to trigger the first terminal device to collect another gesture. After receiving the prompt information, the user holding the first terminal device determines the destination address of the ride-hailing by making the second gesture. For example, the first terminal device collects the second gesture made by the user after receiving the prompt information, and sends the second gesture to the second terminal device. The second terminal device sends the second gesture to the ride-hailing platform.

At S303, a travel order including the departure address and the destination address is generated. The destination address matches the second gesture, and the departure address is associated with the location of the first terminal device. For specific implementation, reference may be made to S103.

At S304, the travel order is sent for confirmation of the travel order.

In some embodiments, the ride-hailing platform sends the travel order to the first terminal device via the second terminal device, such that the user holding the first terminal device may confirm whether the information in the travel order is correct. If the information is confirmed to be incorrect, the travel order can be canceled in time. The information in the travel order may include not only the departure address and the destination address, but also information such as travel time and number of passengers.

Understandably, the ride-hailing platform needs to send the travel order to the target vehicle. If the target vehicle agrees to accept the travel order, it means that the user holding the first terminal device has successfully booked the car (i.e., the target vehicle). At this time, the ride-hailing platform may send vehicle information of the target vehicle accepting the travel order to the first terminal device, such that the user can take a ride according to the vehicle information. In some embodiments, the target vehicle may be all vehicles contracted with the ride-hailing platform, or idle vehicles that have not received a travel order, or vehicles of a specific model such as sport utility vehicle (SUV).

In some embodiments, when the first terminal device cannot directly communicate with the ride-hailing platform, the second terminal device is used to realize the communication between the first terminal device and the ride-hailing platform, which expands the scope of using the first terminal device to make the request for a travel order.

Figure 6:
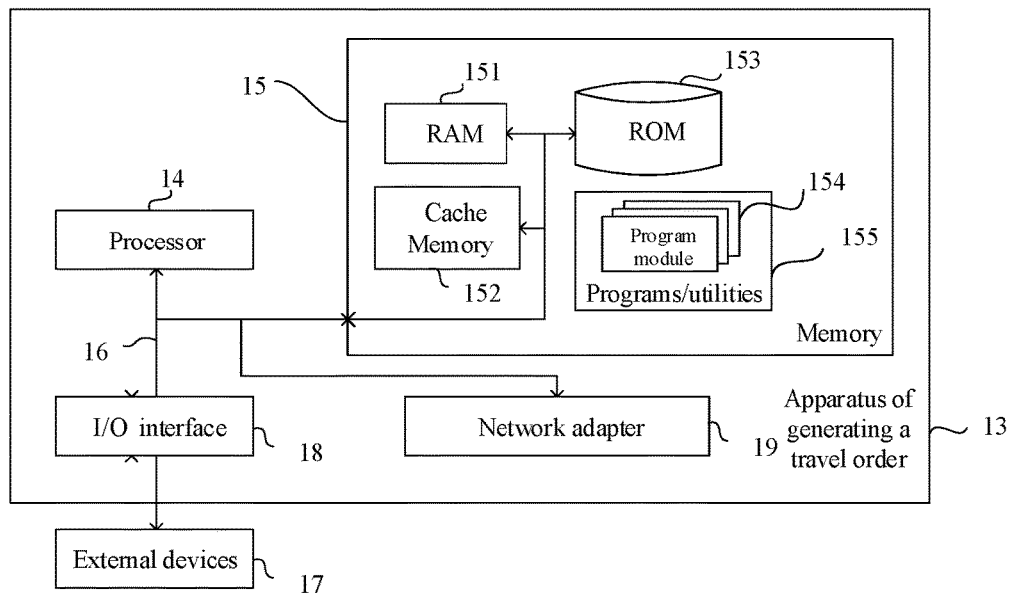
FIG. 6 is a schematic structural diagram of an exemplary device for generating a travel order according to some embodiments of the present disclosure.

FIG. 6 is a schematic structural diagram of an exemplary device for generating a travel order according to some embodiments of the present disclosure. The device for generating a travel order includes a processor and a memory. The memory stores a computer program that runs on the processor. When executing the computer program, the processor performs the method for generating a travel order. The device 13 for generating a travel order shown in FIG. 6 is merely exemplary, and should not impose any limitation on functions and scopes of the embodiments of the present disclosure.

Components or system components of the device 13 for generating a travel order may include but not limited to: at least one processor 14, at least one memory 15, and a bus 16 connecting different system components (including the at least one memory 15 and the at least one processor 14).

The bus 16 includes a data bus, an address bus, and a control bus.

The at least one memory 15 may include a volatile memory, such as a random-access memory (RAM) 151 and/or a cache memory 152, and may further include a read only memory (ROM) 153.

The at least one memory 15 may also include programs/utilities 155 having a set (at least one) of program modules 154 including, but not limited to: an operating system, one or more application programs, other program modules, and program data. Each or certain combination of the embodiments may include the implementation of a network environment.

The at least one processor 14 executes various functional applications and data processing by running the computer program stored in the at least one memory 15, such as the method for generating a travel order.

The device 13 for generating a travel order may communicate with one or more external devices 17 (such as keyboards, pointing devices, etc.) Such communication may occur through an input/output (I/O) interface 18. Moreover, the device 13 for generating a travel order may also communicate with one or more networks, such as a local area network (LAN), a wide area network (WAN), and/or a public network (i.e., the Internet) through a network adapter 19. As shown in FIG. 6, the network adapter 19 communicates with other modules of the device 13 for generating a travel order through the bus 16. It should be understood that although not shown in FIG. 6, other hardware and/or software modules may be used in conjunction with the device 13 for generating a travel order, including but not limited to: microcode, device drivers, redundant processors, external disk drive arrays, RAID disk array systems, tape drives, and data backup storage systems.

It should be noted that although several units/modules or sub-units/sub-modules of the device for generating a travel order have been described in detail, the division is merely exemplary and not mandatory. Actually, according to the embodiments of the present disclosure, features and functions of two or more units/modules described above may be embodied in one unit/module. Conversely, the features and functions of one unit/module described above may be further divided to be embodied by a plurality of units/modules.

Embodiment Two

Figure 7:
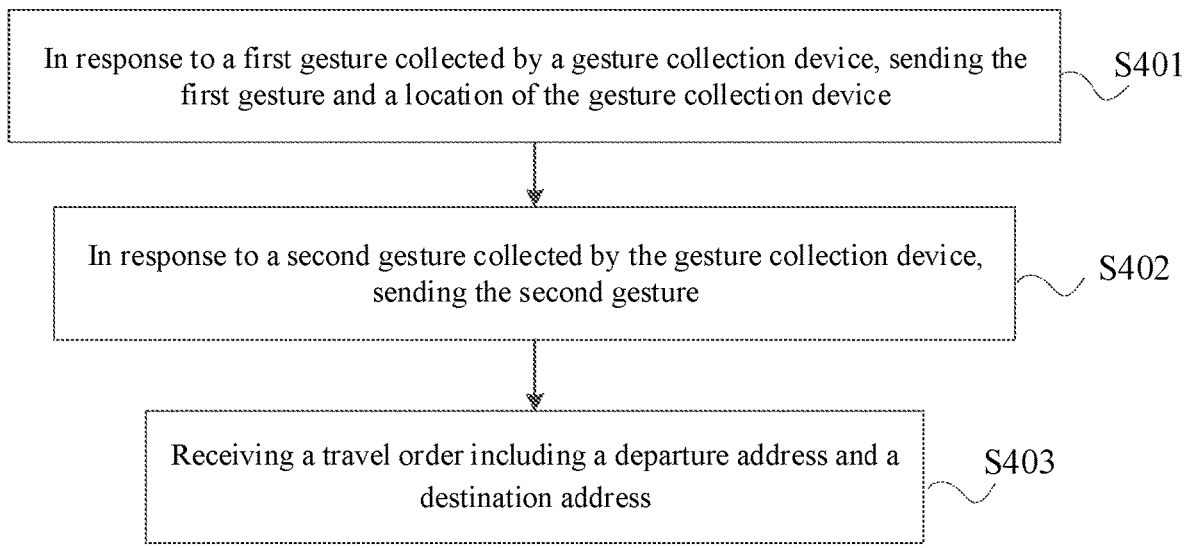
FIG. 7 is a flowchart of an exemplary method of ride-hailing according to some embodiments of the present disclosure.

FIG. 7 is a flowchart of an exemplary method of ride-hailing according to some embodiments of the present disclosure. The method of ride-hailing, also referred to as the method of hailing a car, may be executed by a system of ride-hailing or a system of hailing a car. The ride-hailing system may be implemented by software and/or hardware, which can be part or all of a terminal device. The terminal device may be a mobile terminal such as a mobile phone, a wearable device, a notebook computer, and a tablet computer. As an example, the method for ride-hailing performed on the terminal device will be described below. As shown in FIG. 7, the method of ride-hailing provided by the present disclosure may include the following processes (S401-S403).

At S401, the first gesture and the location are sent in response to the first gesture collected by a gesture collection device.

In some embodiments, the user uses the terminal device to book a car, and the terminal device directly communicates with the ride-hailing platform. For example, the communication may be performed through a wireless local area network or a cellular network. At S401, the first gesture made by the user is collected by the gesture collection device built into the terminal device, and the first gesture is sent to the ride-hailing platform. In some embodiments, the gesture collection device is a gyroscope, which is used to collect angular velocities of X, Y, and Z axes of the terminal device, and to determine the first gesture according to the collected angular velocities.

In addition, the location information sent by positioning satellites may be received by a GPS module built into the terminal device, and the location information sent by base stations may be received by a SIM chip built into the terminal device. A location of the terminal device may be determined based on the location information, and the location is sent to the ride-hailing platform.

At S402, in response to the second gesture collected by the gesture collection device, the second gesture is sent.

In some embodiments, the second gesture is collected in response to the received prompt information. The ride-hailing platform sends the prompt information to the first terminal device in response to the request for a travel order triggered by the first gesture, to trigger the first terminal device to collect the second gesture.

After receiving the prompt information, the user holding the terminal device determines the destination address of the ride-hailing by making a second gesture. For example, the terminal device collects the second gesture made by the user after receiving the prompt information, and sends the second gesture to the ride-hailing platform. The ride-hailing platform receives the second gesture sent by the terminal device, and searches for an address matching the second gesture in the pre-stored relationships between gestures and addresses as the destination address. For example, the user may wear a smart watch and handwrite numbers "1", "2" and so on in the air. In the relationships between gestures and destination addresses, the destination address matching the gesture corresponding to the handwritten number "1" is Addr1, and the destination address matching the gesture corresponding to the handwritten number "2" is Addr2.

At S403, the travel order including a departure address and a destination address is received. The departure address is associated with the location, and the destination address matches the second gesture.

In some embodiments, the user holding the terminal device may confirm the information in the travel order. If the information is confirmed to be incorrect, the travel order can be canceled in time. The information in the travel order may include not only the departure address and the destination address, but also information such as travel time and number of passengers.

In the ride-hailing method provided by the present disclosure, the user holding the terminal device can realize the car-hailing by making the first gesture and the second gesture. Compared with the need for the user to manually operate the ride-hailing software, the method provides convenience for the user to book a car, and improves the user's ride-hailing experience.

In some embodiments, the first terminal device communicates with the ride-hailing platform through the second terminal device. Specifically, at S401, the first gesture and the location are sent to the ride-hailing platform through the second terminal device, and at S402, the second gesture is sent to the ride-hailing platform through the second terminal device.

In some embodiments, the first terminal device collects the first gesture made by the user, and sends the first gesture and the location of the first terminal device to the second terminal device. The second terminal device sends the first gesture and the location of the first terminal device to the ride-hailing platform. The ride-hailing platform receives the first gesture and the location of the first terminal device sent by the second terminal device. The first terminal device and the second terminal device may be mobile terminals such as mobile phones, wearable devices, notebook computers, and tablet computers. The first terminal device communicates with the second terminal device through the Bluetooth network, the wireless local area network, or the cellular network. The second terminal device communicates with the ride-hailing platform through the wireless local area network or the cellular network.

In some embodiments, the first terminal device is a smart bracelet, and the second terminal device is a mobile phone. The smart bracelet and the mobile phone are connected through Bluetooth. Due to the limited memory space of the smart bracelet, it is impossible to install the ride-hailing software. Thus, the smart bracelet needs to communicate with the ride-hailing platform through the ride-hailing software installed in the mobile phone.

In some embodiments, when the terminal device cannot directly communicate with the ride-hailing platform, the second terminal device is used to realize the communication between the terminal device and the ride-hailing platform, which expands the scope of using the terminal device for ride-hailing.

Figure 8:
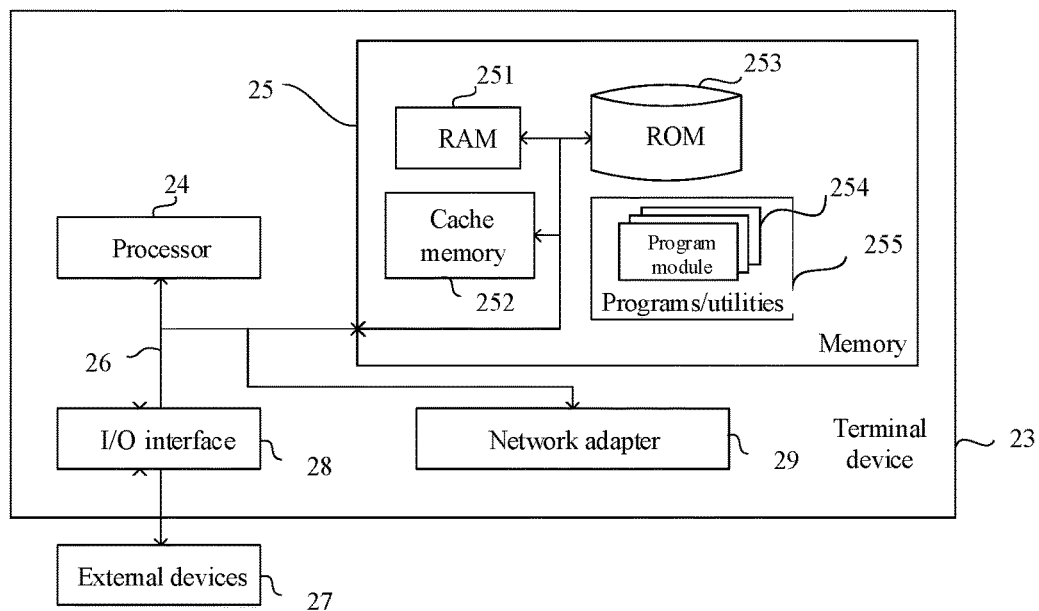
FIG. 8 is a schematic structural diagram of an exemplary terminal device according to some embodiments of the present disclosure.

FIG. 8 is a schematic structural diagram of an exemplary terminal device according to some embodiments of the present disclosure. The terminal device includes at least one processor, a memory communicatively coupled to the at least one processor, and a transceiver for communicating with other devices. The memory stores instructions executable by the at least one processor. When the at least one processor executes the instructions, the at least one processor performs the ride-hailing method. The terminal device 23 shown in FIG. 8 is merely exemplary, and should not limit the functions and scopes of the embodiments of the present disclosure.

Components or system components of the terminal device 23 may include, but are not limited to: the at least one processor 24, the memory 25, and the bus 26 connecting different system components (including the memory 25 and the at least one processor 24).

The bus 26 includes a data bus, an address bus and a control bus.

The memory 25 may include a volatile memory, such as a random-access memory (RAM) 251 and/or a cache memory 252, and may further include a read only memory (ROM) 253.

The memory 25 may also include a program/utility tool 255 having a set (at least one) of program modules 254. The set of program modules 254 includes, but is not limited to, an operating system, one or more application programs, other program modules, and program data. Each or certain combination of the examples may include the implementation of a network environment.

The at least one processor 24 executes various functional applications and data processing by running a computer program stored in the memory 25, such as the ride-hailing method.

The terminal device 23 may also communicate with one or more external devices 27 (e.g., keyboard, pointing device, etc.) The communication may occur through an input/output (I/O) interface 28. Moreover, the terminal device 23 may also communicate with one or more networks, such as a local area network (LAN), a wide area network (WAN), and/or a public network (e.g., the Internet) through a network adapter 29. As shown in FIG. 8, the network adapter 29 communicates with other modules of the terminal device 23 through the bus 26. It should be understood that although not shown in FIG. 8, other hardware and/or software modules may be used in conjunction with terminal device 23, including but not limited to: microcode, device drivers, redundant processors, external disk drive arrays, RAID disk array systems, tape drives, and data backup storage systems.

It should be noted that although several units/modules or sub-units/sub-modules of the terminal device are described in detail above, the division is merely exemplary and not mandatory. Actually, according to the embodiments of the present disclosure, the features and functions of two or more units/modules described above may be embodied in one unit/module. Conversely, the features and functions of one unit/module described above may be further divided to be embodied by a plurality of units/modules.

Embodiment Three

Figure 9:
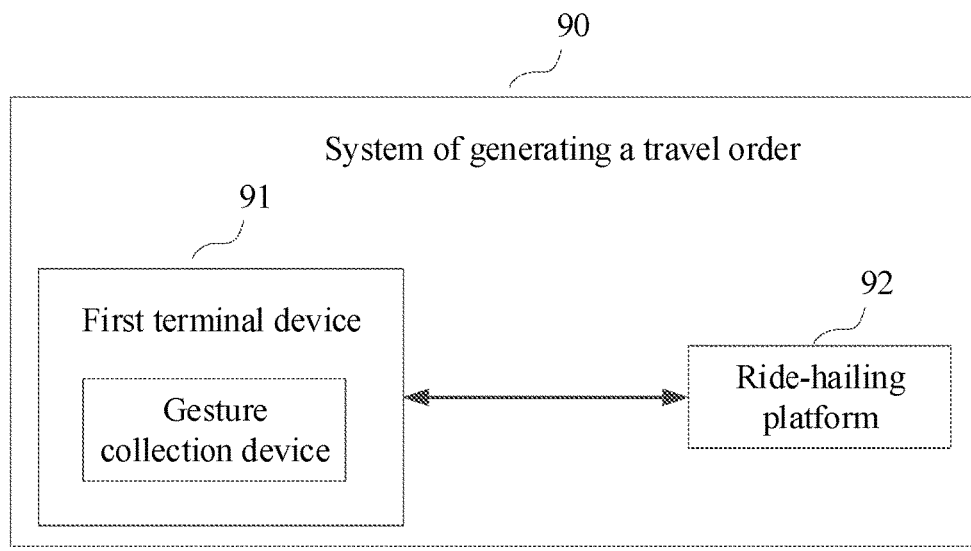
FIG. 9 is a schematic structural diagram of an exemplary system for generating a travel order according to some embodiments of the present disclosure.

FIG. 9 is a schematic structural diagram of an exemplary system for generating a travel order according to some embodiments of the present disclosure. As shown in FIG. 9, the system for generating a travel order 90 includes a first terminal device 91 and a ride-hailing platform 92. The first terminal device 91 includes a gesture collection device for collecting gestures.

The first terminal device 91 is configured to send the first gesture and the location of the first terminal device to the ride-hailing platform 92 in response to the collected first gesture.

The ride-hailing platform 92 is configured to receive the second gesture collected by the first terminal device in response to the request for a travel order triggered by the first gesture, generate the travel order including a departure address and a destination address, and send the travel order. The departure address is associated with the location of the first terminal device, and the destination address matches the second gesture.

In some embodiments, the user holding the first terminal device makes the first gesture and the second gesture to book a car on the ride-hailing platform. As compared with the need for the user to manually operate the ride-hailing software, the system for generating a travel order provides the convenience for the user to book a car and improves the user's ride-hailing experience.

In some embodiments, the first terminal device communicates directly with the ride-hailing platform. The first terminal device may be a mobile terminal such as a mobile phone, a wearable device, a notebook computer, and a tablet computer. The first terminal device may communicate with the ride-hailing platform through a wireless local area network or a cellular network.

Figure 10:
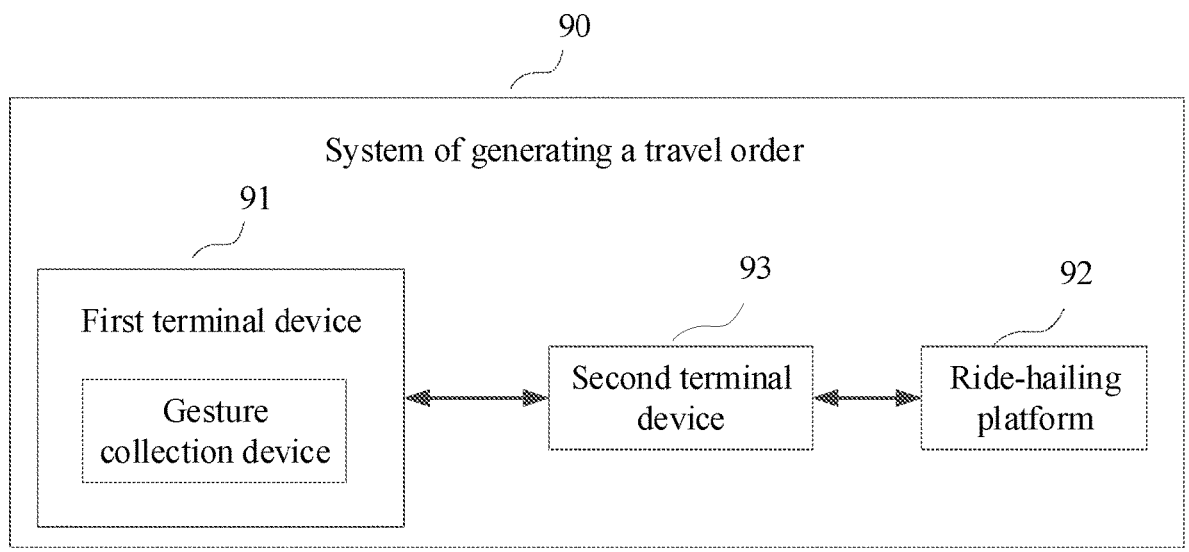
FIG. 10 is a schematic structural diagram of another exemplary system for generating a travel order according to some embodiments of the present disclosure.

In some embodiments, as shown in FIG. 10, the system for generating a travel order further includes a second terminal device 93. In some embodiments, the first terminal device 91 communicates with the ride-hailing platform 92 through the second terminal device 93. The first terminal device and the second terminal device may be mobile terminals such as mobile phones, wearable devices, notebook computers, and tablet computers. The first terminal device communicates with the second terminal device through the Bluetooth network, the wireless local area network or the cellular network. The second terminal device communicates with the ride-hailing platform through the wireless local area network or the cellular network.

In some embodiments, the first terminal device is configured to send the first gesture and the location of the first terminal device to the second terminal device. The second terminal device is configured to send the first gesture and the location of the first terminal device to the ride-hailing platform. The ride-hailing platform receives the second gesture collected by the first terminal device and sent by the second terminal device in response to the request for a travel order triggered by the first gesture. The ride-hailing platform is configured to generate the travel order including the departure address and the destination address.

In some embodiments, when the first terminal device cannot directly communicate with the ride-hailing platform, the second terminal device is configured to realize the communication between the first terminal device and the ride-hailing platform, which expands the scope of using the first terminal device for ride-hailing.

Example Four

The present disclosure provides a non-transitory computer-readable storage medium storing computer instructions. The computer instructions are executed by a computer to cause the computer to perform the method for generating a travel order in Embodiment One or the method for hailing a car in Embodiment Two.

For example, the computer-readable storage medium may include, but is not limited to: a portable disk, a hard disk, a random-access memory, a read-only memory, an erasable programmable read-only memory, an optical storage device, a magnetic storage device, and a combination thereof.

The embodiments of the present disclosure may also be implemented in the form of a program product. The program product may include program codes. When the program product runs on the terminal device, the program codes are configured to make the terminal device perform the method of generating a travel order in Embodiment One or the method of hailing a car in Embodiment Two.

The program codes for implementing the embodiments of the present disclosure may be written in any combination of one or more programming languages. The program codes may be entirely executed on the terminal device, partially executed on the terminal device, executed as an independent software package, partially executed on the terminal device and partially executed on a remote device, or entirely on the remote device.

Although the embodiments of the present disclosure have been described above, those skilled in the art should understand that the descriptions are intended to be merely exemplary, and the scope of the present disclosure is defined by the appended claims. Those skilled in the art can make various changes or modifications to the embodiments without departing from the principle and essence of the present disclosure. However, these changes and modifications all fall within the scope of the present disclosure.

What is claimed is:

1. A method of generating a travel order, comprising:
receiving a first gesture of a user collected by a first terminal device and a location of the first terminal device, wherein the first gesture comprises at least one of: a finger gesture, a hand gesture, or an arm gesture;
in response to the first gesture being determined to match the target gesture, triggering the request for a travel order;
in response to the request for the travel order triggered by the first gesture, receiving a second gesture collected by the first terminal device;
in response to the first terminal device being determined to be located within a vehicle-accessible area, setting the departure address to be the location of the first terminal device;
in response to the first terminal device being determined to be located in an area inaccessible by a car, obtaining a target location adjacent to the first terminal device, and setting the departure address to be the target location, wherein the target location is within a vehicle-accessible area;
generating the travel order including a departure address and a destination address, wherein the destination address matches the second gesture, and the departure address is associated with the location of the first terminal device; and
sending the travel order.

2. The method according to claim 1, wherein receiving the second gesture collected by the first terminal device in response to the request for a travel order triggered by the first gesture includes:
in response to the request for a travel order triggered by the first gesture, sending prompt information to the first terminal device to trigger the first terminal device to collect the second gesture; and
receiving the second gesture collected by the first terminal device.

3. The method according to claim 1, wherein:
receiving the first gesture collected by the first terminal device and the location of the first terminal device includes receiving the first gesture and the location of the first terminal device sent by a second terminal device; and
receiving the second gesture collected by the first terminal device includes receiving the second gesture collected by the first terminal device sent by the second terminal device.

4. The method according to claim 1, wherein:
the destination address is sent to a second terminal after the destination address is selected, or the travel order is sent to the second terminal after the travel order is generated, such that the second terminal obtains an itinerary.

5. The method according to claim 1, wherein:
the vehicle-accessible area is an area that is not located in an access-restricted residential area, a scenic area, or an area where vehicles are prohibited from entering.

6. The method according to claim 1, wherein:
determining the destination address matching the second gesture includes searching for a destination address that matches the second gesture in pre-stored relationships between gestures and destination addresses.

7. An apparatus of generating a travel order, comprising:
a memory;
a processor coupled to the memory; and
a computer program stored in the memory and executable by the processor;
wherein when being executed by the processor, the computer program causes the processor to perform:
receiving a first gesture of a user collected by a first terminal device and a location of the first terminal device, wherein the first gesture comprises at least one of: a finger gesture, a hand gesture, or an arm gesture;
in response to the first gesture being determined to match the target gesture, triggering the request for a travel order;
in response to the request for the travel order triggered by the first gesture, receiving a second gesture collected by the first terminal device;
in response to the first terminal device being determined to be located within a vehicle-accessible area, setting the departure address to be the location of the first terminal device;
in response to the first terminal device being determined to be located in an area inaccessible by a car, obtaining a target location adjacent to the first terminal device, and setting the departure address to be the target location, wherein the target location is within a vehicle-accessible area;
generating the travel order including a departure address and a destination address, wherein the destination address matches the second gesture, and the departure address is associated with the location of the first terminal device; and
sending the travel order.

8. The apparatus according to claim 7, wherein:
the vehicle-accessible area is an area that is not located in an access-restricted area where vehicles are prohibited from entering.

9. The apparatus according to claim 7, wherein when receiving the second gesture collected by the first terminal device in response to the request for a travel order triggered by the first gesture, the processor is further configured to:
in response to the request for a travel order triggered by the first gesture, send prompt information to the first terminal device to trigger the first terminal device to collect the second gesture; and
receive the second gesture collected by the first terminal device.

10. The apparatus according to claim 7, wherein:
determining the destination address matching the second gesture includes searching for a destination address that matches the second gesture in pre-stored relationships between gestures and destination addresses.

11. The apparatus according to claim 7, wherein:
receiving the first gesture collected by the first terminal device and the location of the first terminal device includes receiving the first gesture and the location of the first terminal device sent by a second terminal device; and
receiving the second gesture collected by the first terminal device includes receiving the second gesture collected by the first terminal device sent by the second terminal device.

* * * * *